United States Patent
Gross et al.

(10) Patent No.: US 12,427,883 B2
(45) Date of Patent: *Sep. 30, 2025

(54) SYSTEMS AND METHODS FOR QR CODE BATTERY HEALTH BASED TRACKING

(71) Applicant: STATE FARM MUTUAL AUTOMOBILE INSURANCE COMPANY, Bloomington, IL (US)

(72) Inventors: Ryan Gross, Normal, IL (US); Matthew S. Megyese, Bloomington, IL (US); Joseph P. Harr, Bloomington, IL (US); Scott Thomas Christensen, Salem, OR (US); Vicki King, Bloomington, IL (US); Shawn Harbaugh, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 425 days.

This patent is subject to a terminal disclaimer.

(21) Appl. No.: 17/887,218

(22) Filed: Aug. 12, 2022

(65) Prior Publication Data

US 2023/0406140 A1 Dec. 21, 2023

Related U.S. Application Data

(60) Provisional application No. 63/392,048, filed on Jul. 25, 2022, provisional application No. 63/356,257, (Continued)

(51) Int. Cl.
*B60L 53/00* (2019.01)
*B60L 53/65* (2019.01)
(Continued)

(52) U.S. Cl.
CPC ............... *B60L 53/65* (2019.02); *B60L 53/66* (2019.02); *B60L 53/68* (2019.02); *B60L 58/12* (2019.02); *G06Q 30/0645* (2013.01)

(58) Field of Classification Search
CPC .......... B60L 53/65; B60L 53/68; B60L 53/66; B60L 58/12; G06Q 30/0645
(Continued)

(56) References Cited

U.S. PATENT DOCUMENTS 9,311,271 B2 4/2016 Wright
9,633,487 B2 4/2017 Wright
(Continued)

FOREIGN PATENT DOCUMENTS

EP 3239686 A1 11/2017
EP 3578433 B1 8/2020
(Continued)

*Primary Examiner* — Tiffany P Young
*Assistant Examiner* — Michael T Dowling
(74) *Attorney, Agent, or Firm* — MARSHALL, GERSTEIN & BORUN LLP

(57) ABSTRACT

A computer-implemented method in a mobile computing device for tracking health and usage of electric vehicle (EV) batteries using Quick Response (QR) codes (or NFC or RFID tags) is provided. The method may include (1) capturing, by a camera associated with a mobile computing device, an image of a tag affixed to an EV; (2) analyzing the image of the tag affixed to the EV; (3) identifying, by the one or more processors of the mobile computing device, the EV based upon analyzing the image of the tag affixed to the EV; (4) determining vehicle battery data associated with a rechargeable battery that powers the identified EV; (5) determining based upon the vehicle battery data associated with the rechargeable battery that powers the identified EV, a battery status indication corresponding to the identified
(Continued)

EV; and/or (6) providing, via a user interface, the battery status indication corresponding to the identified EV.

23 Claims, 5 Drawing Sheets

Related U.S. Application Data filed on Jun. 28, 2022, provisional application No. 63/352,913, filed on Jun. 16, 2022.

(51) Int. Cl.
    *B60L 53/66*           (2019.01)
    *B60L 53/68*           (2019.01)
    *B60L 58/12*           (2019.01)
    *G06Q 30/0645*      (2023.01)

(58) Field of Classification Search
    USPC .......................................................... 701/22
    See application file for complete search history.

(56) References Cited

U.S. PATENT DOCUMENTS

| | | |
|---|---|---|
| 9,718,371 B2 | 8/2017 | Anglin et al. |
| 9,830,748 B2 | 11/2017 | Rosenbaum |
| 9,990,782 B2 | 6/2018 | Rosenbaum |
| 10,192,369 B2 | 1/2019 | Wright |
| 10,198,879 B2 | 2/2019 | Wright |
| 10,269,190 B2 | 4/2019 | Rosenbaum |
| 10,354,333 B1 | 7/2019 | Hayward |
| 10,437,904 B2 | 10/2019 | Corghi |
| 10,467,824 B2 | 11/2019 | Rosenbaum |
| 10,663,529 B1 | 5/2020 | Bolotski et al. |
| 11,227,452 B2 | 1/2022 | Rosenbaum |
| 11,407,410 B2 | 8/2022 | Rosenbaum |
| 11,524,707 B2 | 12/2022 | Rosenbaum |
| 11,594,083 B1 | 2/2023 | Rosenbaum |
| 2013/0317693 A1 | 11/2013 | Jefferies et al. |
| 2014/0340231 A1* | 11/2014 | Stukenberg ............ G06F 3/0482 715/739 |
| 2017/0004712 A1 | 1/2017 | Yang |
| 2018/0158039 A1* | 6/2018 | Cox ................... G06Q 20/4037 |
| 2018/0315127 A1* | 11/2018 | Chappell ............ G06Q 20/3223 |
| 2019/0215882 A1 | 7/2019 | Kim |
| 2020/0019925 A1 | 1/2020 | Tokhtabaev |
| 2020/0164763 A1 | 5/2020 | Holme |
| 2020/0333151 A1 | 10/2020 | Akhtar |
| 2022/0072974 A1* | 3/2022 | Huang .................... G06F 16/27 |
| 2022/0092893 A1 | 3/2022 | Rosenbaum |
| 2022/0123559 A1* | 4/2022 | Stefanopoulou ......... G09B 5/02 |
| 2022/0340148 A1 | 10/2022 | Rosenbaum |
| 2022/0393457 A1* | 12/2022 | Olander .................... H02H 3/04 |
| 2023/0060300 A1 | 3/2023 | Rosenbaum |
| 2023/0202344 A1* | 6/2023 | Simonis ................. B60L 58/10 701/22 |

FOREIGN PATENT DOCUMENTS

| | | | |
|---|---|---|---|
| EP | 3730375 B1 | 10/2021 | |
| EP | 3960576 A1 | 3/2022 | |
| EP | 4190659 A1 | 6/2023 | |
| EP | 4190660 A1 | 6/2023 | |
| WO | WO-2013144954 A1 * | 10/2013 | .............. B60L 53/65 |

* cited by examiner

SYSTEMS AND METHODS FOR QR CODE BATTERY HEALTH BASED TRACKING

CROSS-REFERENCE TO RELATED APPLICATIONS

The present application claims priority to U.S. Provisional Patent App. No. 63/392,048, filed Jul. 25, 2022, and entitled "SYSTEMS AND METHODS FOR QR CODE BATTERY HEALTH BASED TRACKING;" U.S. Provisional Patent App. No. 63/356,257, filed Jun. 28, 2022, and entitled "SYSTEMS AND METHODS FOR QR CODE BATTERY HEALTH BASED TRACKING;" and U.S. Provisional Patent App. No. 63/352,913, filed Jun. 16, 2022, and entitled "SYSTEMS AND METHODS FOR QR CODE BATTERY HEALTH BASED TRACKING;" the entire disclosures of each which are incorporated by reference herein.

FIELD OF THE DISCLOSURE

The present disclosure generally relates to technologies associated with monitoring a battery of a vehicle, such as an electric vehicle (EV), and, more particularly, to tracking the health and usage of EV batteries using quick response (QR) codes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Technologies associated with operation of electric vehicles (EVs, i.e., vehicles that use electric motors for propulsion) are improving and becoming more ubiquitous. As a result, use of EVs (e.g., on roadways, rails, underwater, air, space) is expected to increase, with EVs expected to at least partially replace conventional (i.e., internal combustion engine) vehicles. A typical EV is powered autonomously by a battery (e.g., lithium-ion battery), also known as an electric-vehicle battery (EVB), which is used to power the propulsion system of the EV. The battery may be recharged at a charging station, and may be mechanically replaced at special stations.

If a user is renting an EV, or is purchasing a new or used EV, the health and usage of the battery of the EV may be an important factor in the user's selection. For instance, factors such as the frequency at which the user must recharge the EV battery, the charging time for the EV battery, the remaining battery life of the EV battery, etc., will all affect the user's use of the EV. However, currently there is no convenient way for a user to determine these EV battery health and usage factors, which may change in real time as vehicle sensor data and historical vehicle data are collected.

That is, while an EV on a rental or dealership lot may include an attached sticker or other tag that lists permanent/static information about the vehicle, such as the make, model, color, number of seats, price, etc., these attached stickers or tags may be currently unable to provide updated data related to the health and usage of the battery of the EV. Conventional techniques may be ineffective, inefficient, cumbersome, or inadequate, and may have other drawbacks as well.

SUMMARY

According to the present embodiments, methods and systems for tracking the health and usage of electric vehicle (EV) batteries using attached tags, such as Quick Response (QR) codes, Near Field Communication (NFC) tags, or Radiofrequency Identification (RFID) tags are provided. For instance, unique QR codes may be assigned to each of a plurality of EVs. These QR codes may be affixed to, or otherwise positioned on, their respective EVs, e.g., at a sales lot or at a rental vehicle facility. Each QR code may be linked to battery health and battery usage data for its respective EV, such that a mobile device application that captures an image of the QR code may access the battery health and battery usage data for the EV, and in some cases, other vehicle information related to the EV. For instance, upon capturing an image of the QR code, the mobile device application may display indications of battery health or usage information associated with the battery of the EV, in addition to other information associated with the EV, such as indications of the EV's make, model, build, etc., via a graphical user interface (GUI).

Moreover, in some examples, upon capturing an image of the QR code, the mobile device application may display indications of additional information associated with the EV and/or the battery of the EV, such as the type of battery, the year the EV and/or the battery was manufactured, the battery manufacturer, and/or battery performance data, such as how far the vehicle travels on a charge, number of recharges, maintenance data, etc., via the GUI. For instance, in some examples, the maintenance data may include an indication of whether the battery of the EV has previously been damaged and/or repaired, as well as the timing of the repair and/or amount of time between repairs, the number of repairs, etc. Furthermore, in some examples, upon capturing an image of the QR code, the mobile device application may display indications of the number of hours of driving with the current battery, as well as an estimated or predicted remaining battery life (e.g., remaining hours of driving) based upon the historical usage, via the GUI. In some examples, the estimated or predicted remaining battery life may be based upon the type of driving, time of the year, location, etc. In some cases, the estimated or predicted remaining battery life may be predicted using a machine learning model trained using historical battery health and usage data in various conditions.

In one aspect, a computer-implemented method of tracking the health and usage of EV batteries using QR codes, carried out by one or more local or remote processors, may be provided. The method may be implemented via one or more local or remote processors, servers, transceivers, sensors, scanners, cameras, imaging units, memory units, and/or other electrical or electronic components. In one instance, the method may include: (1) capturing, by a camera associated with a mobile computing device, an image of a tag affixed to an EV; (2) analyzing, by one or more processors of the mobile computing device, the image of the tag affixed to the EV; (3) identifying, by the one or more processors of the mobile computing device, the EV based upon analyzing the image of the tag affixed to the EV; (4) determining, by the one or more processors of the mobile computing device, vehicle battery data associated with a rechargeable battery that powers the identified EV; (5) determining, by the one or more processors of the mobile computing device, based upon the vehicle battery data associated with the rechargeable battery that powers the identified EV, a battery status indication corresponding to the identified EV; and/or (6)

providing, via a user interface associated with the mobile computing device, the battery status indication corresponding to the identified EV. The method may include additional, less, or alternate actions, including those discussed elsewhere herein.

In another aspect, a computer system for tracking the health and usage of electric vehicle (EV) batteries using QR codes may be provided. The computer system may include one or more local or remote processors, servers, transceivers, sensors, scanners, cameras, imaging units, memory units, and/or other electric or electronic components. The computer system may include a battery health and usage application comprising a set of computer-executable instructions configured to execute on one or more processors selected from a device processor of mobile computing device or a server processor, and the mobile computing device may include a camera, a user interface, a transceiver, and a memory. The computing instructions, when executed by the one or more processors, may cause the one or more processors to: (1) cause the camera to capture an image of a tag affixed to an EV; (2) analyze the image of the tag affixed to the EV; (3) identify the EV based upon analyzing the image of the tag affixed to the EV; (4) determine vehicle battery data associated with a rechargeable battery that powers the identified EV; (5) determine, based upon the vehicle battery data associated with the rechargeable battery that powers the identified EV, a battery status indication corresponding to the identified EV; and/or (6) provide, via the user interface, the battery status indication corresponding to the identified EV. The mobile computing device may include or be configured with additional, less, or alternate functionality, including that discussed elsewhere herein.

In another aspect, a non-transitory computer-readable storage medium storing computer-readable instructions for tracking the health and usage of EV batteries using QR codes may be provided. The computer-readable instructions, when executed by one or more processors, cause the one or more processors to (1) cause a camera to capture an image of a tag affixed to an EV; (2) analyze the image of the tag affixed to the EV; (3) identify the EV based upon analyzing the image of the tag affixed to the EV; (4) determine vehicle battery data associated with a rechargeable battery that powers the identified EV; (5) determine, based upon the vehicle battery data associated with the rechargeable battery that powers the identified EV, a battery status indication corresponding to the identified EV; and/or (6) provide, via a user interface, the battery status indication corresponding to the identified EV. The computer-executable instructions may direct additional, less, or alternate functionality, including that discussed elsewhere herein.

In still another aspect, a computer-implemented method of tracking the health and usage of EV batteries using QR codes, carried out by one or more local or remote processors, may be provided. The method may be implemented via one or more local or remote processors, servers, transceivers, sensors, scanners, cameras, imaging units, memory units, and/or other electrical or electronic components. In one instance, the method may include: (1) capturing, by a camera associated with a mobile computing device, an image of a tag affixed to an EV; (2) analyzing, by one or more processors of the mobile computing device, the image of the tag affixed to the EV; (3) identifying, by the one or more processors of the mobile computing device, the EV based upon analyzing the image of the tag affixed to the EV; (4) determining, by the one or more processors of the mobile computing device, vehicle battery data associated with a rechargeable battery that powers the identified EV, wherein one or more of identifying the EV or determining the vehicle battery data associated with the rechargeable battery that powers the identified EV include accessing, by the one or more processors, a blockchain storing data associated with one or more of the identified EV or the rechargeable battery that powers the EV; (5) determining, by the one or more processors of the mobile computing device, based upon the vehicle battery data associated with the rechargeable battery that powers the identified EV, a battery status indication corresponding to the identified EV; and/or (6) providing, via a user interface associated with the mobile computing device, the battery status indication corresponding to the identified EV. The method may include additional, less, or alternate actions, including those discussed elsewhere herein.

In another aspect, a computer system for tracking the health and usage of electric vehicle (EV) batteries using QR codes may be provided. The computer system may include one or more local or remote processors, servers, transceivers, sensors, scanners, cameras, imaging units, memory units, and/or other electric or electronic components. The computer system may include a battery health and usage application comprising a set of computer-executable instructions configured to execute on one or more processors selected from a device processor of mobile computing device or a server processor, and the mobile computing device may include a camera, a user interface, a transceiver, and a memory. The computing instructions, when executed by the one or more processors, may cause the one or more processors to: (1) cause the camera to capture an image of a tag affixed to an EV; (2) analyze the image of the tag affixed to the EV; (3) identify the EV based upon analyzing the image of the tag affixed to the EV; (4) determine vehicle battery data associated with a rechargeable battery that powers the identified EV; (5) determine, based upon the vehicle battery data associated with the rechargeable battery that powers the identified EV, a battery status indication corresponding to the identified EV, wherein one or more of identifying the EV or determining the vehicle battery data associated with the rechargeable battery that powers the identified EV include accessing a blockchain storing data associated with one or more of the identified EV or the rechargeable battery that powers the EV; and/or (6) provide, via the user interface, the battery status indication corresponding to the identified EV. The mobile computing device may include or be configured with additional, less, or alternate functionality, including that discussed elsewhere herein.

In another aspect, a non-transitory computer-readable storage medium storing computer-readable instructions for tracking the health and usage of EV batteries using QR codes may be provided. The computer-readable instructions, when executed by one or more processors, cause the one or more processors to (1) cause a camera to capture an image of a tag affixed to an EV; (2) analyze the image of the tag affixed to the EV; (3) identify the EV based upon analyzing the image of the tag affixed to the EV; (4) determine vehicle battery data associated with a rechargeable battery that powers the identified EV; (5) determine, based upon the vehicle battery data associated with the rechargeable battery that powers the identified EV, a battery status indication corresponding to the identified EV, wherein one or more of identifying the EV or determining the vehicle battery data associated with the rechargeable battery that powers the identified EV include accessing a blockchain storing data associated with one or more of the identified EV or the rechargeable battery that powers the EV; and/or (6) provide, via a user interface, the battery status indication corresponding to the identified EV. The computer-executable instructions may direct additional, less, or alternate functionality, including that discussed elsewhere herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

There are shown in the drawings arrangements which are presently discussed, it being understood, however, that the present embodiments are not limited to the precise arrangements and instrumentalities shown, wherein.

Figure 1:
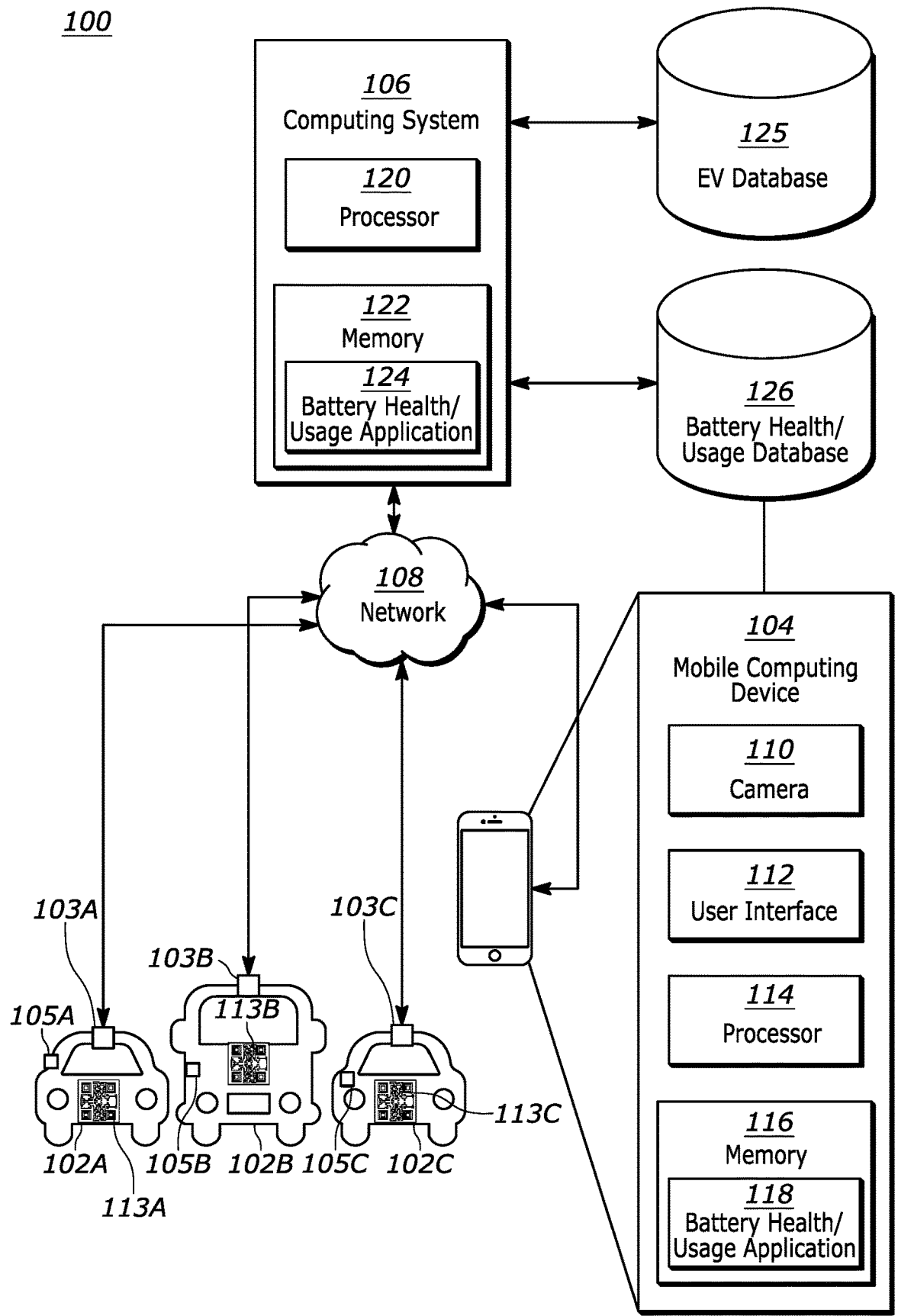
FIG. 1 depicts an exemplary computer system for tracking the health and usage of electric vehicle (EV) batteries using quick response (QR) codes, according to one embodiment.

While the systems and methods disclosed herein is susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples. Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

The present embodiments may relate to, inter alia, methods and systems for tracking the health and usage of electric vehicle (EV) batteries using QR codes, NFC tags, RFID tags, or other attached tags, including smart tags. For instance, unique QR codes may be assigned to each of a plurality of EVs. These QR codes may be affixed to, or otherwise positioned on, their respective EVs, e.g., at a sales lot or at a rental vehicle facility.

Each QR code may be linked to battery health and battery usage data for its respective EV, such that a mobile device application that captures an image of the QR code may access the battery health and battery usage data for the EV, and in some cases, other vehicle information related to the EV. For instance, upon capturing an image of the QR code, the mobile device application may display indications of battery health or usage information associated with the battery of the EV, in addition to other information associated with the EV, such as indications of the EV's make, model, build, etc., via a graphical user interface (GUI).

Moreover, in some examples, upon capturing an image of the QR code, the mobile device application may display indications of additional information associated with the EV and/or the battery of the EV, such as the type of battery, the year the EV and/or the battery was manufactured, the battery manufacturer, and/or battery performance data, such as how far the vehicle travels on a charge, number of recharges, maintenance data, etc., via the GUI. For instance, in some examples, the maintenance data may include an indication of whether the battery of the EV has previously been damaged and/or repaired, as well as the timing of the repair and/or amount of time between repairs, the number of repairs, etc. Furthermore, in some examples, upon capturing an image of the QR code, the mobile device application may display indications of the number of hours of driving with the current battery, as well as an estimated or predicted remaining battery life (e.g., remaining hours of driving) based upon the historical usage, via the GUI.

In some examples, the estimated or predicted remaining battery life may be based upon the type of driving, time of the year, location, etc. Additionally or alternatively, the estimated or predicted remaining battery life may be predicted using a machine learning model trained using historical battery health and usage data in various conditions.

The data discussed herein, such as the data associated with the EV, EV battery, battery performance, and estimated remaining life, may be stored and/or used for additional purposes, such as providing insurance quotes, insurance discounts, vehicle loan information or quotes, auto insurance information, and/or EV and EV battery maintenance or care recommendations to the EV owner or prospective owner. In certain embodiments, the data discussed herein may be stored and/or accessible via one or more blockchains or distributed ledgers.

For example, a blockchain is a distributed database or ledger that is shared among various replicated computing nodes of a computer network. As a database, a blockchain stores information electronically in a digital format. Blockchains are routinely used for cryptocurrency implementations, one popular example of which is BITCOIN cryptocurrency. A blockchain, for example, may be used to maintain a secure and decentralized record of transactions regarding cryptocurrency. A blockchain is considered secure as it guarantees the fidelity and authenticity of a record of data and establishes trust between two parties without the need for a trusted third party, whereby each transaction may be verified by the information stored upon replicated. For these reasons, blockchain based technology is typically considered to be more secure or authentic than off-chain technology.

Exemplary System for Tracking the Health and Usage of Electric Vehicle (EV) Batteries Using QR Codes Referring now to the drawings, FIG. 1 depicts an exemplary system 100 for tracking the health and usage of electric vehicle (EV) batteries using Quick Response (QR) codes, according to one embodiment. The high-level architecture illustrated in FIG. 1 may include both hardware and software applications, as well as various data communications channels for communicating data between the various hardware and software components, as is described below.

The system 100 may include one or more EVs 102A, 102B, 102C, each including a respective onboard computing system 103A, 103B, 103C, as well as a mobile computing device 104, and a computing system 106, which is described in greater detail below with respect to FIG. 3, each configured to communicate with one another via a wired or wireless computer network 108. Although three EVs 102A, 102B, 102C, are shown in FIG. 1, any number of EVs may be included in various embodiments. Similarly, although one mobile computing device 104, one computing system 106, and one network 108 are shown in FIG. 1, any number of such mobile computing devices 104, computing systems 106, and networks 108 may be included in various embodiments.

Any one or more of the EVs 102A, 102B, and 102C may be hybrid or fully electric vehicles, and the operation of the EVs 102A, 102B, and 102C, respectively, may be at least partially powered by respective rechargeable batteries 105A, 105B, and 105C. The onboard computing systems 103A, 103B, 103C of each respective EV may store, capture and/or record data related to the respective rechargeable batteries 105A, 105B, 105C (i.e., "vehicle battery data"). For instance, onboard computing systems 103A, 103B, 103C may store data indicating the types of rechargeable batteries 105A, 105B, 105C that are currently installed in each respective EV 102A, 102B, 102C, a manufacturer of the corresponding rechargeable battery 105A, 105B, 105C, and/or a date of manufacture of the corresponding rechargeable battery 105A, 105B, 105C.

The onboard computing systems 103A, 103B, 103C may also capture and/or store data including, for instance, indications of distances traveled by each respective EV 102A, 102B, 102C per charge of the corresponding rechargeable battery 105A, 105B, 105C, indications of the number of times the corresponding rechargeable battery 105A, 105B, 105C that powers each respective EV 102A, 102B, 102C has been charged, as well as, e.g., dates and times of each charge, indications of amounts of time required to charge the corresponding rechargeable battery 105A, 105B, 105C for each charge, and/or indications of amounts of time between charges for the corresponding rechargeable battery 105A, 105B, 105C, etc.

The onboard computing systems 103A, 103B, 103C of each respective EV 102A, 102B, 102C may store, capture and/or record data related to the EV (i.e., "vehicle data"), including an indication of a make of the respective EV 102A, 102B, 102C, a model of the respective EV 102A, 102B, 102C, a build of the respective EV 102A, 102B, 102C, a vehicle identification number (VIN) associated with the respective EV 102A, 102B, 102C, vehicle operational or telematics data associated with the respective EV 102A, 102B, 102C, and/or other sensor data associated with the respective EV 102A, 102B, 102C.

That is, in some examples, the onboard computing systems 103A, 103B, 103C of the respective EVs 102A, 102B, 102C may include or may communicate with sensors (not shown) associated with the respective EVs 102A, 102B, 102C, including, e.g., motion sensors (accelerometers, gyroscopes, velocity sensors, etc.), telematics sensors configured to capture data associated with the operation of the vehicle, such as acceleration, braking, turns, etc., environmental sensors configured to capture data associated with the environment of the vehicle such as temperature, precipitation, and/or road conditions, location sensors (such as GPS sensors), sensors configured to detect the charge remaining on each respective rechargeable battery 105A, 105B, 105C, sensors configured to detect dates/times at which rechargeable batteries 105A, 105B, 105C are charged and the duration of each charge, or any other suitable sensors for capturing data associated with the EVs 102A, 102B, 102C and/or the rechargeable batteries 105A, 105B, 105C of the EVs 102A, 102B, 102C.

The onboard computing systems 103A, 103B, 103C of the respective EVs 102A, 102B, 102C may send the vehicle data and/or vehicle battery data (as well as other captured sensor data) to the mobile computing device 104 and/or to the computing system 106, automatically or based upon requests from the mobile computing device 104 and/or the computing system 106.

Each of the EVs 102A, 102B, 102C may be associated with a respective vehicle tag 113A, 113B, 113C, which may be permanently or removably attached to their respective EVs 102A, 102B, 102C. The vehicle tags 113A, 113B, 113C, discussed in greater detail with respect to FIG. 2 below, may include a QR code and/or a bar code or other symbology, as well as additional images and/or text in some embodiments.

The mobile computing device 104 may comprise a mobile device and/or client device. Mobile computing device 104 may include a camera 110, a user interface 112 configured to provide information to users and receive input from users (e.g., such as a touch/display screen, a haptic user interface, and/or an audio user interface), one or more mobile processor(s) (e.g., processor(s) 114), and a memory 116. Additionally, in some examples, mobile computing device 104 may further include additional components for reading proximity tags, such as an NFC reader for reading NFC tags, an RFID reader for reading RFID tags, etc. In various aspects, mobile computing device 104 may comprise a mobile phone (e.g., a cellular phone), a tablet device, a personal data assistance (PDA), or the like, including, by non-limiting example, an APPLE iPhone or iPad device or a GOOGLE ANDROID based mobile phone or tablet.

In various aspects, mobile computing device 104 may implement or execute an operating system (OS) or mobile platform such as APPLE iOS and/or Google ANDROID operation system. The one or more processors 112 and/or one or more memorie(s) 114 may be configured for storing, implementing, or executing computing instructions or code, e.g., a battery health and usage application 118, as described in various aspects herein. As shown in FIG. 1, the battery health and usage application 118, or at least portions thereof (e.g., a client-side portion), may also be stored locally on memory (e.g., memory 114) of a user computing device (e.g., mobile computing device 104).

Another portion, e.g., a server-side portion, of the battery health and usage application 118 may be stored on the computing system 106 as battery health and usage application 124 where the battery health and usage application 118 executing on the mobile computing device 104 is communicatively coupled, via computer network 108, to the battery health and usage application 124. For example, the battery health and usage application 118 may communicate via an API and may transmit data to and receive data from the battery health and usage application 124. To facilitate such communications the mobile computing device 104 may comprise a wireless transceiver to receive and transmit wireless communications to and from base stations, which then may be transmitted and/or received via computer network 108 to the computing system 106.

Executing the battery health and usage application 118 may include capturing an image (or receiving a captured image) of a respective vehicle tag 113A, 113B, 113C associated with a particular corresponding EV 102A, 102B, 102C. For instance, the image may be captured by the camera 110 of the mobile computing device 104, or may be captured by another device and received by the mobile computing device 104.

Furthermore, executing the battery health and usage application 118 may include analyzing the image of the respective tag 113A, 113B, or 113C in order to identify the particular EV associated with the tag. For instance, an image of the vehicle tag 113A may be analyzed to identify the EV 102A, an image of the vehicle tag 113B may be analyzed to identify the EV 102B, and/or an image of the vehicle tag 113C may be analyzed to identify the EV 102C. For instance, a given QR code, bar code, or other symbology displayed on a respective vehicle tag 113A, 113B, 113C and captured in the image may correspond to a particular EV of the EVs 102A, 102B, 102C. Additionally, in some examples, executing the battery health and usage application 118 may include causing an NFC reader to read an NFC tag on the vehicle tag 113A, 113B, 113C, and/or causing an RFID reader to read an RFID tag on the vehicle tag 113A, 113B, 113C, in order to identify the particular EV associated with the tag. For instance, an NFC tag of the vehicle tag 113A may be analyzed by the NFC reader to identify the EV 102A, an RFID tag of the vehicle tag 113B may be analyzed to identify the EV 102B, and/or an NFC tag of the vehicle tag 113C may be analyzed to identify the EV 102C.

In some examples, identifying the particular EV of the EVs 102A, 102B, 102C may include decoding and/or analyzing the QR code, bar code, NFC tag, RFID tag, or other symbology, and subsequently accessing a database, such as an EV database 125 (or communicating with another device configured to access the database, such as the computing system 106), in order to match the decoded QR code, bar code, NFC tag, RFID tag, or other symbology to an identification of a particular EV and/or particular EV battery. Moreover, in some examples, identifying the particular EV of the EVs 102A, 102B, 102C may include decoding and/or analyzing the QR code, bar code, NFC tag, RFID tag, or other symbology, and subsequently accessing a blockchain storing data associated with the EV, and/or storing data associated with matching EVs and QR codes, bar codes, NFC tags, RFID tags, or other symbologies. For instance, the blockchain may store data associated with the EV, and/or data associated with matching EVs and QR codes, bar codes, NFC tags, RFID tags, or other symbologies, in one or more blocks of transactions, where each transaction includes data associated with the EV, and/or data associated with matching EVs and QR codes, bar codes, NFC tags, RFID tags, or other symbologies, respectively.

Executing the battery health and usage application 118 may further include determining vehicle battery data associated with the respective rechargeable battery 105A, 105B, 105C, that powers the corresponding identified EV 102A, 102B, 102C. For instance, as discussed above, the vehicle battery data may include data indicating the type of the respective rechargeable battery 105A, 105B, 105C that is currently installed in the corresponding EV 102A, 102B, 102C, a manufacturer of the respective rechargeable battery 105A, 105B, 105C, and/or a date of manufacture of the respective rechargeable battery 105A, 105B, 105C.

The onboard computing systems 103A, 103B, 103C may also capture and/or store data including, for instance, indications of distances traveled by the corresponding EV 102A, 102B, 102C per charge of the respective rechargeable battery 105A, 105B, 105C, indications of the number of times the respective rechargeable battery 105A, 105B, 105C that powers the corresponding EV 102A, 102B, 102C has been charged, as well as, e.g., dates and times of each charge, indications of amounts of time required to charge the respective rechargeable battery 105A, 105B, 105C for each charge, and/or indications of amounts of time between charges for the respective rechargeable battery 105A, 105B, 105C, etc.

In some examples, executing the battery health and usage application 118 may further include determining vehicle data associated with the corresponding identified EV 102A, 102B, 102C. For instance, the vehicle data may be data including an indication of a make of the corresponding identified EV 102A, 102B, 102C, a model of the corresponding identified EV 102A, 102B, 102C, a build of the corresponding identified EV 102A, 102B, 102C, a vehicle identification number (VIN) associated with the corresponding identified EV 102A, 102B, 102C, vehicle operational or telematics data associated with the corresponding identified EV 102A, 102B, 102C, and/or other sensor data associated with the corresponding identified EV 102A, 102B, 102C.

Moreover, in some examples, executing the battery health and usage application 118 may further include determining sensor data from sensors associated with the corresponding identified EV 102A, 102B, 102C including, e.g., motion sensors (accelerometers, gyroscopes, velocity sensors, etc.), telematics sensors configured to capture data associated with the operation of the vehicle, such as acceleration, braking, turns, etc., environmental sensors configured to capture data associated with the environment of the vehicle such as temperature, precipitation, and/or road conditions, location sensors (such as GPS sensors), sensors configured to detect the charge remaining on each respective rechargeable battery 105A, 105B, 105C, sensors configured to detect dates/times at which rechargeable batteries 105A, 105B, 105C are charged and the duration of each charge, or any other suitable sensors for capturing data associated with the EVs 102A, 102B, 102C and/or the rechargeable batteries 105A, 105B, 105C of the EVs 102A, 102B, 102C.

Determining the vehicle battery data associated with the respective rechargeable battery 105A, 105B, 105C, that powers the corresponding identified EV 102A, 102B, 102C, and/or determining vehicle data, and/or sensor data associated with the corresponding identified EV 102A, 102B, 102C, may include the mobile computing device 104 requesting and subsequently receiving such data from onboard computing systems 103A, 103B, 103C associated with the corresponding identified EVs 102A, 102B, 102C in some examples, or may include the mobile computing device 104 requesting and subsequently receiving such data from a database, such as a battery health/usage database 126, or from a device, such as the computing system 106, configured to access the database 126. Moreover, in some examples, determining the vehicle battery data associated with the respective rechargeable battery 105A, 105B, 105C, that powers the corresponding identified EV 102A, 102B, 102C, and/or determining vehicle data, and/or sensor data associated with the corresponding identified EV 102A, 102B, 102C, may include the mobile computing device 104 accessing a blockchain storing data associated with the EV, and/or requesting and subsequently receiving such data from a device, such as the computing system 106, configured to access a blockchain storing data associated with the EV. For instance, the blockchain may store data associated with the EV in one or more blocks of transactions, where each transaction includes data associated with the EV.

Furthermore, in some examples, executing the battery health and usage application 118 may further include determining information associated with quotes or loans associated with the corresponding identified EV 102A, 102B, 102C, e.g., that may be used to initiate an insurance quote or a quote for a vehicle loan. In some embodiments, the information associated with quotes or loans associated with the corresponding identified EV 102A, 102B, 102C may also be used to initiate auto insurance contracts and/or auto loans based upon the quotes. The information associated with quotes or loans associated with the corresponding identified EV 102A, 102B, 102C may include information identifying an insurance provider, a bank, and information about the product to be insured, such as the corresponding identified EV 102A, 102B, 102C and/or the corresponding EV battery 105A, 105B, 105C. The information associated with quotes or loans associated with the corresponding identified EV 102A, 102B, 102C may also include information about the entity offering the product for which the insurance quote is being requested. Determining the information associated with quotes or loans associated with the corresponding identified EV 102A, 102B, 102C may include the mobile computing device 104 generating information associated with quotes or loans associated with the corresponding identified EV 102A, 102B, 102C based on, e.g., the vehicle data and/or the vehicle battery data. Additionally, in some examples, determining the information associated with quotes or loans associated with the corresponding identified EV 102A, 102B, 102C may include the mobile computing device 104 requesting and subsequently receiving such data from a database, or from a device, such as the computing system 106, configured to access a database.

Executing the battery health and usage application 118 may further include determining a battery status indication corresponding to the corresponding identified EV 102A, 102B, 102C, based upon the vehicle battery data (as well as vehicle data and/or sensor data) associated with the corresponding identified EV 102A, 102B, 102C. For instance, the battery status indication may be a battery usage indication and/or a battery health indication, i.e., an indication of a current level of battery usage or battery health for the respective battery 105A, 105B, 105C of the corresponding identified EV 102A, 102B, 102C.

Additionally or alternatively, the current level of battery usage or battery health for a respective battery 105A, 105B, 105C may include an indication of distance or time traveled since the last charge or an average distance or time traveled per charge, a date and/or time of the last charge or of any other previous charges, an average amount of time between charges, an amount of charging time for the last charge or any other previous charges, an average charging time for previous charges, a total number of previous charges, a date and/or time of the last replacement battery and/or battery repair, the amount of time, number of charges, and/or distance traveled since the battery was last repaired and/or replaced, a total number of previous battery repairs and/or replacements, etc.

Moreover, in some examples, determining the battery status indication may include predicting a future battery usage indication or a future battery health indication for the respective battery 105A, 105B, 105C of the corresponding identified EV 102A, 102B, 102C. For instance, the prediction of the future battery usage indication or the future battery health indication for the respective battery 105A, 105B, 105C may be a prediction of a travel distance or travel time before another charge is required, a prediction of time between charges, a prediction of charging time, a prediction of when a repair and/or a replacement battery will be needed, etc.

In some examples, predicting the future battery usage indication or the future battery health indication for the respective battery 105A, 105B, 105C may be based upon the vehicle battery data, as well as the vehicle data and/or sensor data associated with the corresponding identified EV 102A, 102B, 102C. For instance, the predicted the future battery usage indication or the future battery health indication for the respective battery 105A, 105B, 105C may be based upon a combination of factors including past battery usage, time of year, type of driving, location, road conditions, etc.

Additionally, in some examples, predicting the future battery usage indication or the future battery health indication for the battery may be based upon input from a user of the mobile computing device (e.g., provided via the user interface 112). For instance, the user may provide an indication of the type of driving he or she plans to do with the corresponding identified EV 102A, 102B, 102C, the location in which the user plans to drive the corresponding identified EV 102A, 102B, 102C, the road conditions in the location in which the user plans to drive the corresponding identified EV 102A, 102B, 102C, the times of year that the user plans to drive the EV, etc., to receive a more accurate prediction of the future battery usage indication or the future battery health indication.

Furthermore, in some examples, predicting the future battery usage indication or the future battery health indication may be based upon applying a trained machine learning model to the vehicle battery data, the vehicle data, and/or the sensor data associated with the corresponding identified EV 102A, 102B, 102C. For instance, the machine learning model may be trained using training data corresponding to historical vehicle battery data, historical vehicle data, and/or historical sensor data associated with historical EVs, and historical battery status indications associated with the historical EVs, to predict a future battery status or the future battery health for a new EV. The trained machine learning model may then be applied to the vehicle battery data, the vehicle data, and/or the sensor data associated with the corresponding identified EV 102A, 102B, 102C in order to predict a battery status indication (i.e., a future battery usage indication or a future battery health indication) for the corresponding identified EV 102A, 102B, 102C.

In various aspects, the machine learning model may comprise a machine learning program or algorithm that may be trained by and/or employ a neural network, which may be a deep learning neural network, or a combined learning module or program that learns in one or more features or feature datasets in particular area(s) of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques.

In some embodiments, the artificial intelligence and/or machine learning based algorithms used to train the machine learning model may comprise a library or package executed on the mobile computing device 104 or the computing system 106 (or other computing devices not shown in FIG.

1). For example, such libraries may include the TENSORFLOW based library, the PYTORCH library, and/or the SCIKIT-LEARN Python library.

Machine learning may involve identifying and recognizing patterns in existing data (such as training a model based upon historical vehicle battery data, historical vehicle data, and/or historical sensor data associated with historical EVs, and indications of battery usage or battery health associated with those historical EVs) in order to facilitate making predictions or identification for subsequent data (such as using the machine learning model on new vehicle battery data, vehicle data, and/or sensor data associated with a new or specific EV in order to determine a prediction of an indications of battery usage or battery health specific to that EV).

Machine learning model(s) may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based upon the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

Additionally, executing the battery health and usage application 118 may further include providing the battery status indication corresponding to the respective identified EV 102A, 102B, 102C, e.g., via the user interface 112 of the mobile computing device 104. Moreover, executing the battery health and usage application 118 may further include providing the information associated with quotes or loans associated with the corresponding identified EV 102A, 102B, 102C, e.g., via the user interface 112 of the mobile computing device 104. In some examples, the battery status indication and/or the information associated with quotes or loans associated with the corresponding identified EV 102A, 102B, 102C may be displayed via the user interface 112 of the mobile computing device 104, and/or may be provided audibly via the user interface 112 of the mobile computing device 104. Moreover, in some examples, the mobile computing device 104 may send the battery status indication, and/or the information associated with quotes or loans associated with the corresponding identified EV 102A, 102B, 102C, to another device (e.g., via the network 108), which may in turn display the battery status indication and/or the information associated with quotes or loans associated with the corresponding identified EV 102A, 102B, 102C, via another user interface.

Furthermore, in some examples, the computer-readable instructions stored on the memorie(s) 114 may include instructions for carrying out any of the steps of the method 400 via an algorithm executing on the processors 112, which is described in greater detail below with respect to FIG. 4.

In some embodiments the computing system 106 may comprise one or more servers, which may comprise multiple, redundant, or replicated servers as part of a server farm. In still further aspects, such server(s) may be implemented as cloud-based servers, such as a cloud-based computing platform. For example, such server(s) may be any one or more cloud-based platform(s) such as MICROSOFT AZURE, AMAZON AWS, or the like. Such server(s) may include one or more processor(s) 120 (e.g., CPUs) as well as one or more computer memories 122.

Memories 122 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 122 may store an operating system (OS) (e.g., Microsoft Windows, Linux, UNIX, etc.) capable of facilitating the functionalities, apps, methods, or other software as discussed herein. Memorie(s) 122 may also store a battery health and usage application 124. Additionally, or alternatively, the memorie(s) 122 may store EV information (i.e., indications of QR codes, bar codes, NFC tags, RFID tag, or other symbologies associated with respective EVs 102A, 102B, 102C) and/or battery health and usage information (i.e., indications of vehicle battery data, vehicle data, and/or sensor data associated with respective EVs 102A, 102B, 102C). The EV information may also be stored in an EV database 125, which may be accessible or otherwise communicatively coupled to the computing system 106. Similarly, the battery health and usage information may also be stored in the battery health and usage database 126, which may be accessible or otherwise communicatively coupled to the computing system 106. In some embodiments, the EV information, including battery health and usage information, may be stored on one or more blockchains or distributed ledgers. For instance, the one or more blockchains may store data the EV information, including battery health and usage information, in one or more blocks of transactions, where each transaction includes data associated with the EV information.

Executing the battery health and usage application 124 may include receiving vehicle battery data, vehicle data, and/or sensor data for various EVs 102A, 102B, 102C from respective onboard computing systems 103A, 103B, 103C associated with the EVs, and storing the data in the memorie(s) 122 or the databases 125 and/or 125. Executing the battery health and usage application 124 may also including accessing the vehicle battery data, vehicle data, and/or sensor data from the memorie(s) 122 or the databases 125 and/or 125 and providing it to the mobile computing device 104 upon request or otherwise. Moreover, in some examples, executing the battery health and usage application 124 of the computing system 106 may include performing any of the steps described above as being performed by the battery health and usage application 118 of the mobile computing device 104, and vice versa.

In addition, memories 122 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. It should be appreciated that one or more other applications may be envisioned and that are executed by the processor(s) 120. It should be appreciated that given the state of advancements of mobile computing devices, all of the processes functions and steps described herein may be present together on a mobile computing device (e.g., user computing device 104).

Furthermore, in some examples, the computer-readable instructions stored on the memory 122 may include instructions for carrying out any of the steps of the method 400 via an algorithm executing on the processors 120, which is described in greater detail below with respect to FIG. 4.

Figure 2:
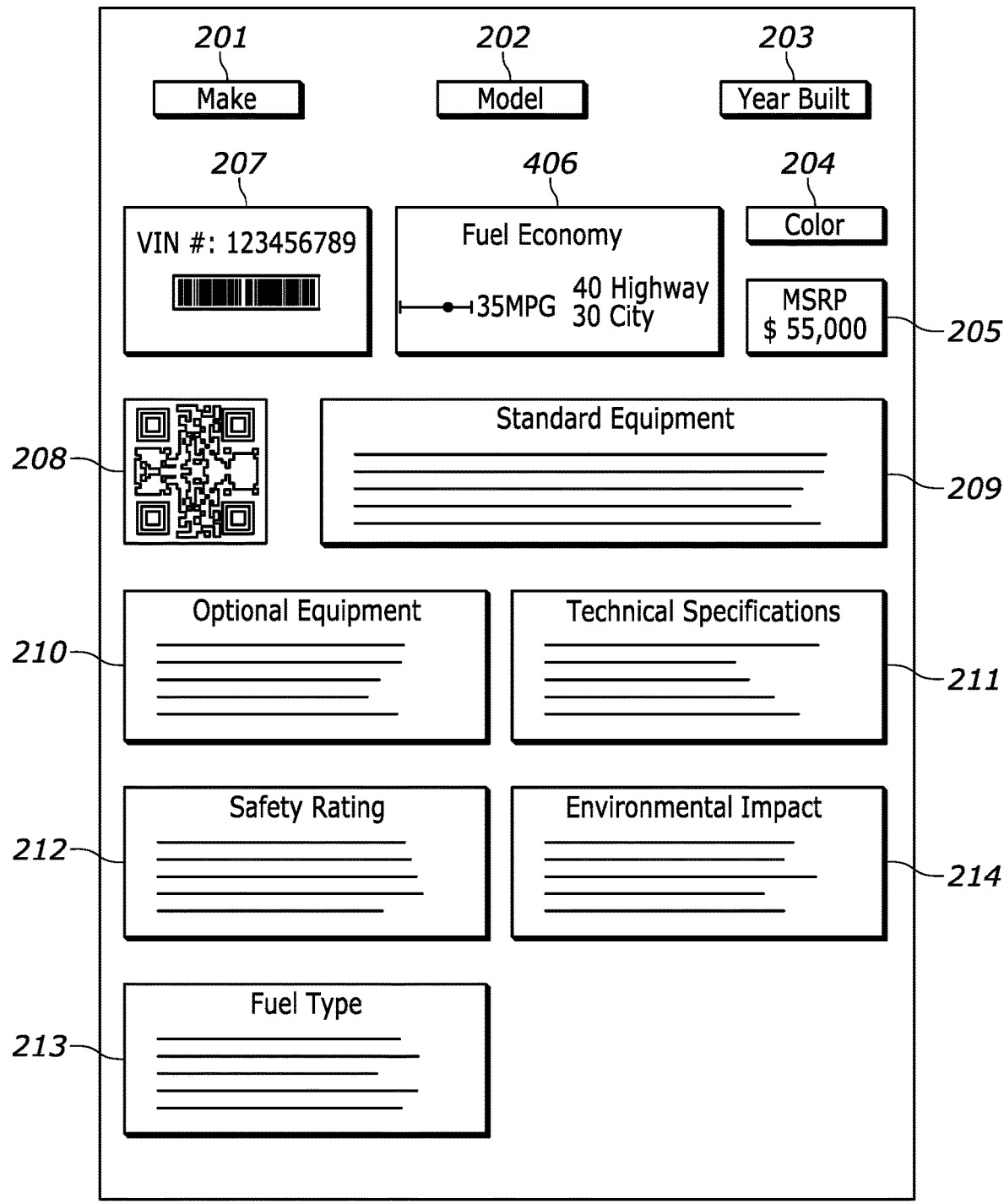
FIG. 2 depicts an exemplary vehicle tag including a QR code via which the health and the usage of EV batteries may be monitored, according to one embodiment.

Exemplary Vehicle Tag Including QR Code Via which Health and Usage of Electric Vehicle (EV) Batteries May be Monitored FIG. 2 depicts an exemplary vehicle tag 113A including a quick response (QR) code (or NFC tag, RFID tag, or other code or smart tag) via which the health and the usage of EV batteries may be monitored, according to one embodiment. While vehicle tag 113A is shown, it is to be understood that the disclosure for 113A applies equally for vehicle tags 113B and 113C. As shown, any of the vehicle tags 113A, 113B, 113C contain various information about a vehicle such as make 201, model 202, year 203, color 204, suggested retail price 205, fuel economy 206, vehicle identification number (VIN) 207, a Quick Response Code (QR code) 208, standard equipment 209, optional equipment 210, technical specifications 211, safety rating 212, fuel type 213, and environmental impact (greenhouse gas rating or carbon footprint) 214. A vehicle tag 113A may contain some, all, or any combination of the elements shown in the example of 113A.

The exemplary vehicle tags 113A, 113B, 113C are not intended to be limiting, and can contain information not shown in the example. Moreover, in some embodiments, any of the make 201, model 202, year 203, color 204, suggested retail price 205, fuel economy 206, vehicle identification number (VIN) 207, standard equipment 209, optional equipment 210, technical specifications 211, safety rating 212, fuel type 213, and/or environmental impact (greenhouse gas rating or carbon footprint) 214 may be omitted from the respective vehicle tags 113A, 113B, 113C, and may accessible by capturing an image of the QR code 208.

Further, the term "vehicle tag" is not intended to be limiting. The "vehicle tag" does not necessarily have to be fixed to a place or object by an adhesive. Any graphic or data sheet with information representing a particular vehicle can be considered a "vehicle tag," in various embodiments.

Figure 3:
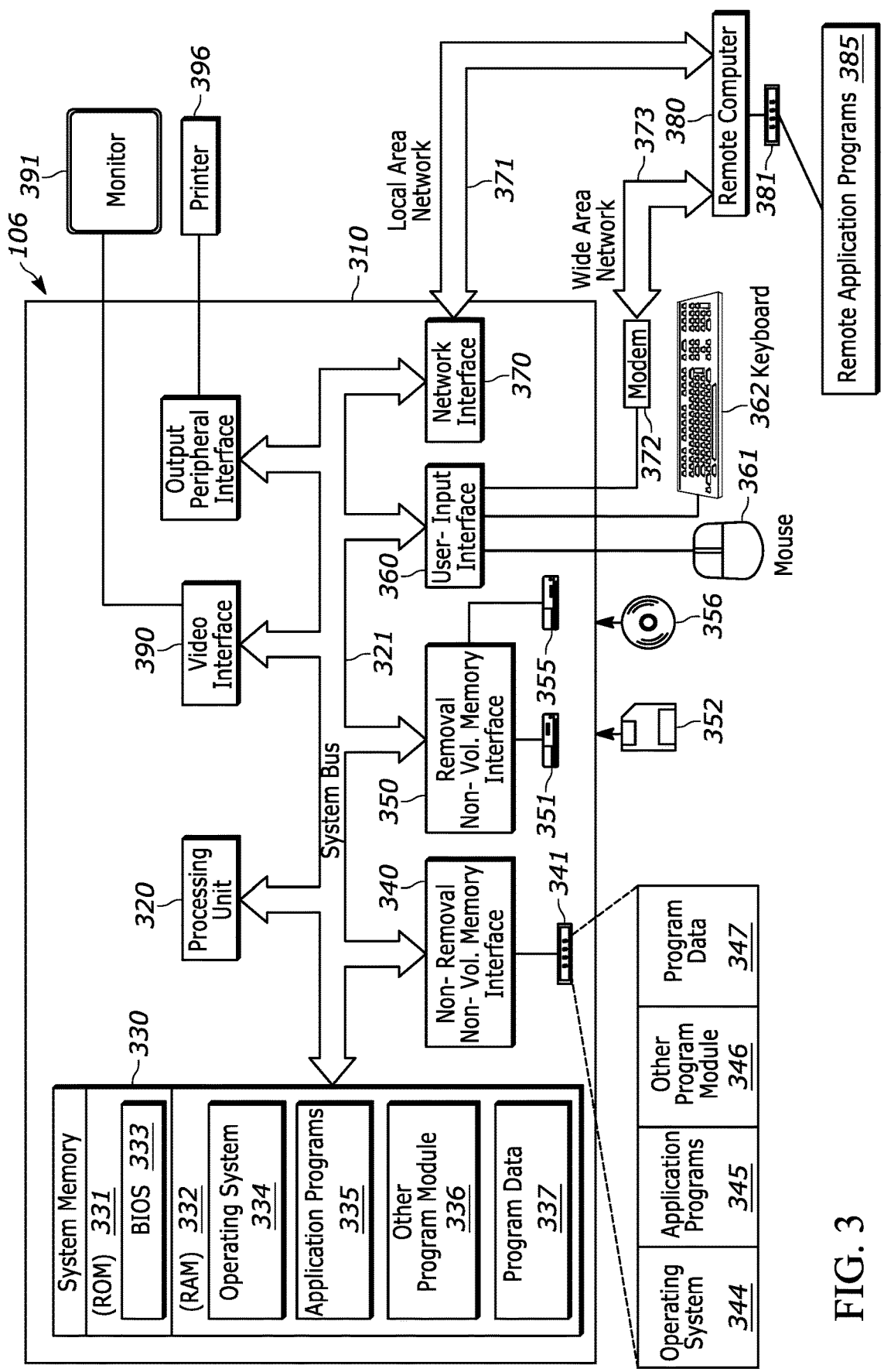
FIG. 3 depicts an exemplary computing system in which the techniques described herein may be implemented, according to one embodiment.

Exemplary Computing System for Tracking the Health and Usage of Electric Vehicle (EV) Batteries Using QR Codes FIG. 3 depicts an exemplary computing system 106 in which the techniques described herein may be implemented, according to one embodiment. The computing system 106 of FIG. 3 may include a computing device in the form of a computer 310. Components of the computer 310 may include, but are not limited to, a processing unit 320 (e.g., corresponding to the processor 120 of FIG. 1), a system memory 330 (e.g., corresponding to the memory 122 of FIG. 1), and a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media.

Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 3 illustrates operating system 334, application programs 335 (e.g., corresponding to the battery health and usage application 124 of FIG. 1), other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 3 provide storage of computer-readable instructions, data structures, program modules and other data for the computer 310. In FIG. 3, for example, hard disk drive 341 is illustrated as storing operating system 344, application programs 345, other program modules 346, and program data 347. Note that these components may either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a mobile computing device (e.g., corresponding to the mobile computing device 104), personal computer, a server, a router, a network PC, a peer device or other common network node, and may include many or all of the elements described above relative to the computer 310, although only a memory storage device 381 has been illustrated in FIG. 3. The logical connections depicted in FIG. 3 include a local area network (LAN) 371 and a wide area network (WAN) 373 (e.g., either or both of which may correspond to the network 108 of FIG. 1), but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 3 illustrates remote application programs 385 as residing on memory device 381.

The techniques for tracking the health and usage of electric vehicle (EV) batteries using quick response (QR) codes described above may be implemented in part or in their entirety within a computing system such as the computing system 106 illustrated in FIG. 3. In some such embodiments, the LAN 371 or the WAN 373 may be omitted. Application programs 335 and 345 may include a software application (e.g., a web-browser application) that is included in user interface 112 of FIG. 1, for example.

Figure 4:
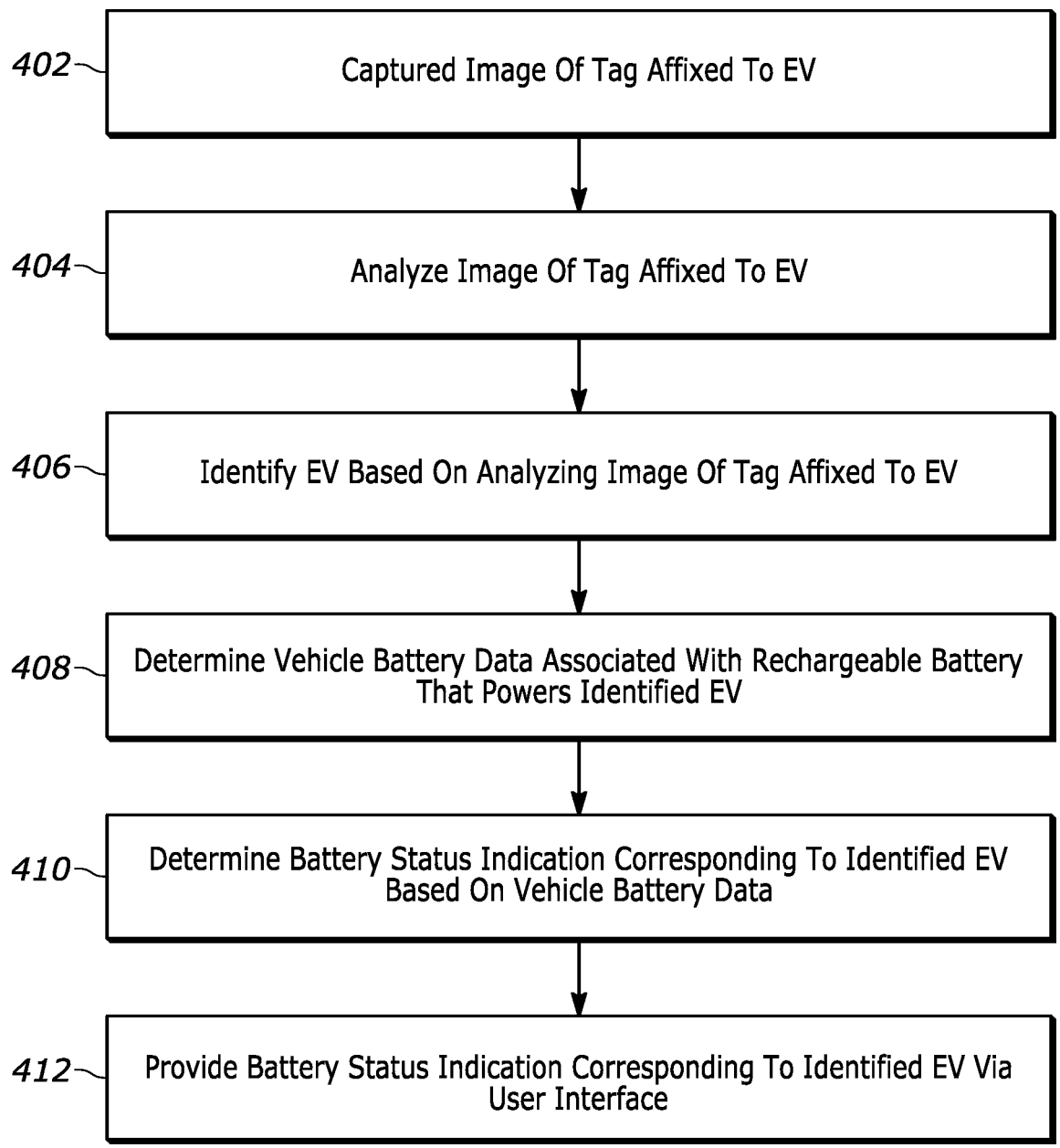
FIG. 4 depicts a flow diagram of an exemplary computer-implemented method for tracking the health and usage of EV batteries using QR codes, according to one embodiment.

Exemplary Computer-Implemented Method for Tracking Health & Usage of Electric Vehicle (EV) Batteries Using QR Codes FIG. 4 depicts a flow diagram of an exemplary computer-implemented method 400 for monitoring one or more batteries of an EV using telematics data associated with operation of the EV, according to one embodiment. One or more steps of the method 400 may be implemented as a set of instructions stored on a computer-readable memory (e.g., memory 122 and/or memory 116) and executable on one or more processors (e.g., processor 120 and/or processor 114)

In the method 400, an image of a tag (e.g., any one or more of tag 113A, 113B, 113C) affixed to an EV (e.g., EVs 102A, 102B, 102C, respectively) may be captured (block 402), e.g., by a camera (e.g., camera 110) associated with a mobile computing device (e.g., mobile computing device 104). In some examples, the EV may be a new or used vehicle available for purchase at a vehicle lot. The image of the tag affixed to the EV may be, for instance, a digital photo or digital video including the tag affixed to the EV. For instance, the tag affixed to the EV may include a QR code, a bar code, etc., as well as other text or images related to the vehicle. In some examples, the tag affixed to the EV may be a sticker. Additionally, in some examples, the tag affixed to the EV may be permanently attached to the EV.

The image of the tag affixed to the EV may be analyzed (block 404). For instance, analyzing the image of the tag affixed to the EV may include implementing one or more of: optical character recognition, bar code scanning, and/or QR code scanning to analyze the image of the tag affixed to the EV.

Additionally, while capturing an image of a tag affixed to an EV is discussed above with respect to block 402, in some examples, a proximity tag affixed to the EV may be analyzed by a specialized reader. For instance, a Near Field Communication (NFC) reader may analyze an NFC tag affixed to the EV. Similarly, a Radiofrequency Identification (RFID) reader may analyzed an RFID tag affixed to the EV.

The EV may be identified (block 406) based upon analyzing the image of the tag affixed to the EV (and/or by analyzing the tag affixed to the EV with a specialized reader, such as an NFC reader, an RFID reader, etc.). For instance, analyzing the image of the tag affixed to the EV may result in determining a unique identification corresponding to the identification of the particular EV to which the tag is affixed, such as a VIN number associated with the EV.

Vehicle battery data associated with a rechargeable battery that powers the identified EV may be determined (block 408). For instance, the vehicle battery data may have been previously captured by an onboard computing device (e.g., one of onboard computing devices 103A, 103B, 103C). The vehicle battery data may include one or more of a type of rechargeable battery, a manufacturer of the rechargeable battery, or a date of manufacture of the rechargeable battery, historical distances traveled by the identified EV per charge of the rechargeable battery that powers the identified EV, a number of times the rechargeable battery that powers the identified EV has been charged, historical amounts of time required to charge the rechargeable battery that powers the identified EV, and/or historical amounts of time between charges for the rechargeable battery that powers the identified EV.

Additionally, in some examples, the method may also include determining (e.g., via a computer network, such as network 108) vehicle data associated with the identified EV. Like the vehicle battery data, the vehicle data may be captured by an onboard computing device associated with the identified EV. For instance, the vehicle data may include a make of the identified EV, a model of the identified EV, a build of the identified EV, a vehicle identification number (VIN) associated with the identified EV, historical vehicle operational or telematics data associated with the identified EV, and/or historical sensor data associated with the identified EV.

Furthermore, in some examples, the method 400 may also include determining (e.g., via a computer network, such as network 108) information associated with quotes or loans corresponding to the identified EV, e.g., that may be used to initiate an insurance quote or a quote for a vehicle loan. In some embodiments, the information associated with quotes or loans corresponding to the identified EV may also be used to initiate auto insurance contracts and/or auto loans based upon the quotes. The information associated with quotes or loans corresponding to the identified EV may include information identifying an insurance provider, a bank, and information about the product to be insured, such as an EV and/or EV battery. The information associated with quotes or loans corresponding to the identified EV may also include information about the entity offering the product for which the insurance quote is being requested.

Based upon the vehicle battery data associated with the rechargeable battery that powers the identified EV, a battery status indication corresponding to the identified EV may be determined (block 410). For instance, the battery status indication may include a battery health indication and/or a battery usage indication.

In some cases, determining the battery status indication corresponding to the identified EV may further be based upon the vehicle data associated with the identified EV.

In some examples, determining the battery status indication corresponding to the identified EV may include applying a machine learning model that is trained using training data corresponding to historical vehicle battery data (and/or historical vehicle data) and historical battery status indications associated with historical EVs, to the vehicle battery data (and/or to the vehicle data), and predicting the battery status indication corresponding to the identified EV based upon applying the trained machine learning model to the vehicle battery data (and/or to the vehicle data).

The battery status indication corresponding to the identified EV may be provided (block 412), e.g., via a user interface (e.g., user interface 112) of the mobile computing device. Additionally, in some examples, any determined information associated with quotes or loans corresponding to the identified EV may also be provided via the user interface of the mobile computing device. The method 400 may include additional, less, or alternate actions, including those discussed elsewhere herein.

Figure 5:
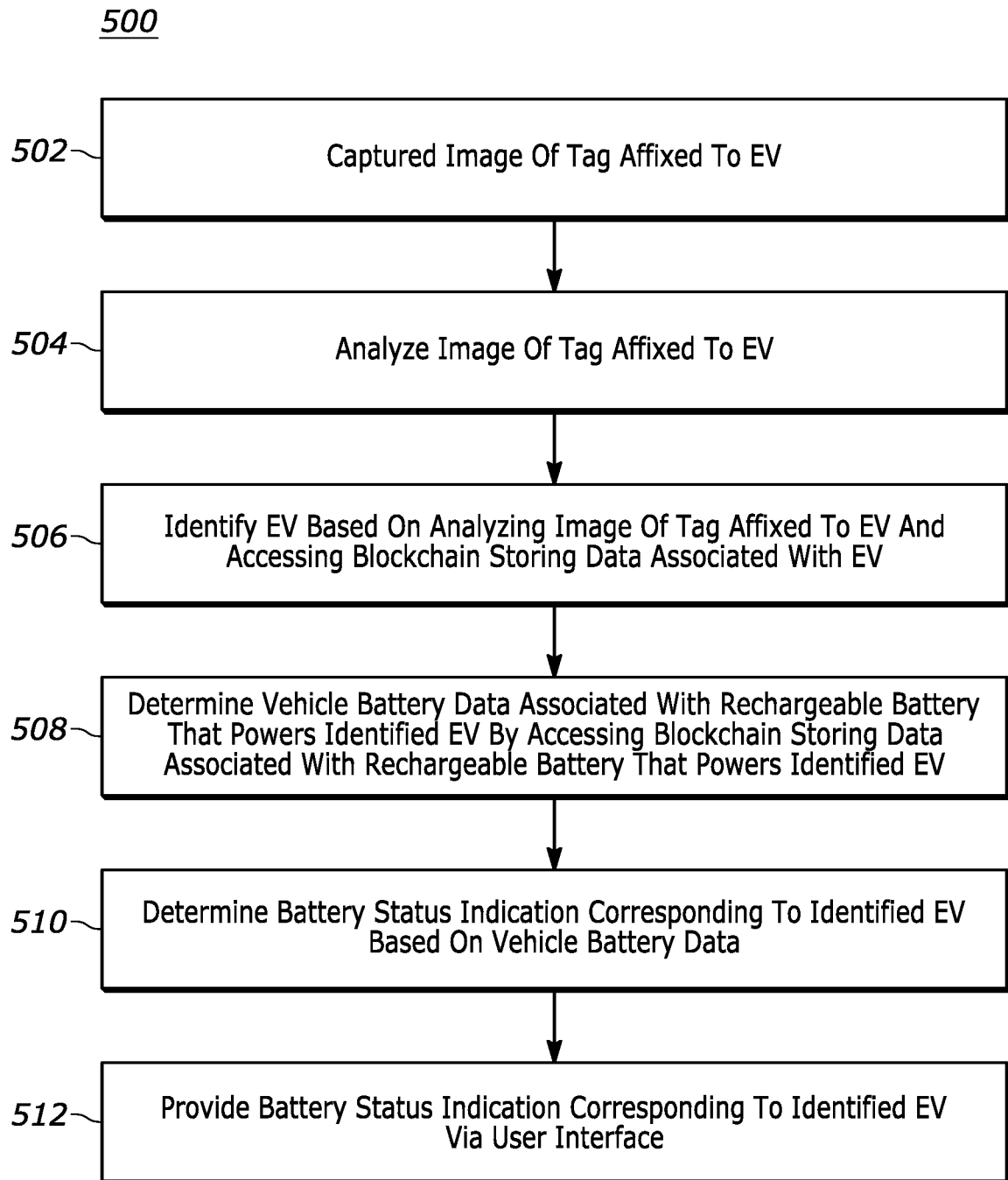
FIG. 5 depicts a flow diagram of an exemplary computer-implemented method for tracking the health and usage of EV batteries by using QR codes to access data stored on a blockchain, according to one embodiment.

Exemplary Computer-Implemented Method for Tracking Health & Usage of Electric Vehicle (EV) Batteries Using QR Codes to Access Vehicle and/or Battery Data Stored on a Blockchain FIG. 5 depicts a flow diagram of an exemplary computer-implemented method 500 for monitoring one or more batteries of an EV using telematics data associated with operation of the EV stored on a blockchain, according to one embodiment. One or more steps of the method 400 may be implemented as a set of instructions stored on a computer-readable memory (e.g., memory 122 and/or memory 116) and executable on one or more processors (e.g., processor 120 and/or processor 114).

In the method 500, an image of a tag (e.g., any one or more of tag 113A, 113B, 113C) affixed to an EV (e.g., EVs 102A, 102B, 102C, respectively) may be captured (block 502), e.g., by a camera (e.g., camera 110) associated with a mobile computing device (e.g., mobile computing device 104). In some examples, the EV may be a new or used vehicle available for purchase at a vehicle lot. The image of the tag affixed to the EV may be, for instance, a digital photo or digital video including the tag affixed to the EV. For instance, the tag affixed to the EV may include a QR code, a bar code, etc., as well as other text or images related to the vehicle. In some examples, the tag affixed to the EV may be a sticker. Additionally, in some examples, the tag affixed to the EV may be permanently attached to the EV.

The image of the tag affixed to the EV may be analyzed (block 504). For instance, analyzing the image of the tag affixed to the EV may include implementing one or more of: optical character recognition, bar code scanning, and/or QR code scanning to analyze the image of the tag affixed to the EV.

Additionally, while capturing an image of a tag affixed to an EV is discussed above with respect to block 502, in some examples, a proximity tag affixed to the EV may be analyzed by a specialized reader. For instance, a Near Field Communication (NFC) reader may analyze an NFC tag affixed to the EV. Similarly, a Radiofrequency Identification (RFID) reader may analyzed an RFID tag affixed to the EV.

The EV may be identified (block 506) based upon analyzing the image of the tag affixed to the EV (and/or by analyzing the tag affixed to the EV with a specialized reader, such as an NFC reader, an RFID reader, etc.) and accessing a blockchain storing data associated with the EV. For instance, analyzing the image of the tag affixed to the EV (and/or otherwise analyzing the tag affixed to the EV) may result in determining a unique identification corresponding to the identification of the particular EV to which the tag is affixed, such as a VIN number associated with the EV. In some examples, matching the tag to the EV may include accessing a blockchain storing indications of EV tags and VIN numbers associated therewith.

Vehicle battery data associated with a rechargeable battery that powers the identified EV may be determined (block 508) by accessing a blockchain that stores data associated with the rechargeable battery that powers the identified EV. For instance, the blockchain may store the data associated with the rechargeable battery in one or more blocks of transactions, where each transaction includes data associated with rechargeable batteries that power respective EVs.

For instance, the vehicle battery data may have been previously captured by an onboard computing device (e.g., one of onboard computing devices 103A, 103B, 103C). The vehicle battery data may include one or more of a type of rechargeable battery, a manufacturer of the rechargeable battery, or a date of manufacture of the rechargeable battery, historical distances traveled by the identified EV per charge of the rechargeable battery that powers the identified EV, a number of times the rechargeable battery that powers the identified EV has been charged, historical amounts of time required to charge the rechargeable battery that powers the identified EV, and/or historical amounts of time between charges for the rechargeable battery that powers the identified EV.

Additionally, in some examples, the method may also include determining (e.g., via a computer network, such as network 108) vehicle data associated with the identified EV. Determining the vehicle data associated with the identified EV may include accessing a blockchain that stores data associated with the identified EV. For instance, the blockchain may store the data associated with the identified EV in one or more blocks of transactions, where each transaction includes data associated with respective EVs. Like the vehicle battery data, the vehicle data may be captured by an onboard computing device associated with the identified EV. For instance, the vehicle data may include a make of the identified EV, a model of the identified EV, a build of the identified EV, a vehicle identification number (VIN) associated with the identified EV, historical vehicle operational or telematics data associated with the identified EV, and/or historical sensor data associated with the identified EV.

Furthermore, in some examples, the method 400 may also include determining (e.g., via a computer network, such as network 108) information associated with quotes or loans corresponding to the identified EV, e.g., that may be used to initiate an insurance quote or a quote for a vehicle loan. In some embodiments, the information associated with quotes or loans corresponding to the identified EV may also be used to initiate auto insurance contracts and/or auto loans based upon the quotes. The information associated with quotes or loans corresponding to the identified EV may include information identifying an insurance provider, a bank, and information about the product to be insured, such as an EV and/or EV battery. The information associated with quotes or loans corresponding to the identified EV may also include information about the entity offering the product for which the insurance quote is being requested.

Based upon the vehicle battery data associated with the rechargeable battery that powers the identified EV, a battery status indication corresponding to the identified EV may be determined (block 410). For instance, the battery status indication may include a battery health indication and/or a battery usage indication.

In some cases, determining the battery status indication corresponding to the identified EV may further be based upon the vehicle data associated with the identified EV.

In some examples, determining the battery status indication corresponding to the identified EV may include applying a machine learning model that is trained using training data corresponding to historical vehicle battery data (and/or historical vehicle data) and historical battery status indications associated with historical EVs, to the vehicle battery data (and/or to the vehicle data), and predicting the battery status indication corresponding to the identified EV based upon applying the trained machine learning model to the vehicle battery data (and/or to the vehicle data).

The battery status indication corresponding to the identified EV may be provided (block 412), e.g., via a user interface (e.g., user interface 112) of the mobile computing device. Additionally, in some examples, any determined information associated with quotes or loans corresponding to the identified EV may also be provided via the user interface of the mobile computing device. The method 500 may include additional, less, or alternate actions, including those discussed elsewhere herein.

Exemplary Applications

The disclosed computer systems and methods make use of information received from proximity information sources associated with the products to be purchased and/or insured. Examples of such proximity information sources may include QR (Quick Response) codes and NFC (Near Field Communication) tags, as well as RFID (radiofrequency identification) tags. The proximity information sources may include quote or loan request information that may be used to initiate an insurance quote or a quote for a vehicle loan. In some embodiments, the quote request information may also be used to initiate auto insurance contracts and/or auto loans based upon the quotes. The proximity information sources may include information identifying an insurance provider, a bank, and information about the product to be insured, such as an EV and/or EV battery. The proximity information sources may also include information about the entity offering the product for which the insurance quote is being requested.

In certain embodiments, a user may scan the proximity information source using their mobile device to establish a communication link with the proximity information source, and receive the request information via the communication link. For example, the user may cause a camera of their mobile device to image the QR code, or cause the mobile device to communicate with a NFC tag, RFID tag, or other smart tag.

In some aspects, the above-described advantages are provided by the user's mobile device operating in accordance with disclosed methods. In environments where a user is considering entering into a transaction for a product (e.g., purchase a new EV) that may involve an associated insurance policy, the user may operate their mobile device to obtain an insurance quote for the product. For example, if the user is considering a transaction such as a purchase or lease of an EV or other vehicle at a vehicle dealership, the user may operate their mobile device to image a QR code (or other code or tag) associated with the vehicle. The QR code in this example may include the insurance quote request information for the vehicle under consideration, such as for example the make, model, year, mileage, and vehicle features, such as advanced vehicle features associated with autonomous or semi-autonomous technologies or systems.

Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for tracking the health and usage of electric vehicle (EV) batteries using QR codes (or NFC tags, RFID tags, smart tags, or other tags or codes). Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method in a mobile computing device for tracking health and usage of electric vehicle (EV) batteries using quick response (QR) codes, the computer-implemented method comprising:
   capturing, by a camera associated with a mobile computing device, an image of a tag attached to an EV, wherein the tag is permanently or removably attached to the EV via a sticker;
   analyzing, by one or more processors of the mobile computing device, the image of the tag attached to the EV;
   identifying, by the one or more processors of the mobile computing device, the EV based upon analyzing the image of the tag attached to the EV;
   determining, by the one or more processors of the mobile computing device, vehicle battery data associated with a rechargeable battery that powers the identified EV;
   determining, by the one or more processors of the mobile computing device, based upon the vehicle battery data associated with the rechargeable battery that powers the identified EV, a battery status indication corresponding to the identified EV; and
   providing, via a user interface associated with the mobile computing device, the battery status indication corresponding to the identified EV.

2. The computer-implemented method of claim 1, wherein the tag attached to the EV includes one or more of: a QR code or a bar code.

3. The computer-implemented method of claim 1, wherein the image of the tag attached to the EV is a digital photo or digital video.

4. The computer-implemented method of claim 1, wherein analyzing the image of the tag attached to the EV includes implementing one or more of: optical character recognition, bar code scanning, or QR code scanning.

5. The computer-implemented method of claim 1, wherein at least a portion of the vehicle battery data is captured by an onboard computing device associated with the identified EV.

6. The computer-implemented method of claim 1, wherein the vehicle battery data includes one or more of: a type of rechargeable battery, a manufacturer of the rechargeable battery, a date of manufacture of the rechargeable battery, historical distances traveled by the identified EV per charge of the rechargeable battery that powers the identified EV, a number of times the rechargeable battery that powers the identified EV has been charged, historical amounts of time required to charge the rechargeable battery that powers the identified EV, or historical amounts of time between charges for the rechargeable battery that powers the identified EV.

7. The computer-implemented method of claim 1, further comprising:
   determining, by the one or more processors of the mobile computing device, via a computer network, vehicle data associated with the identified EV;
   and wherein providing the battery status indication corresponding to the identified EV is further based upon the vehicle data associated with the identified EV.

8. The computer-implemented method of claim 7, wherein at least a portion of the vehicle data is captured by an onboard computing device associated with the identified EV.

9. The computer-implemented method of claim 7, wherein the vehicle data includes one or more of: a make of the identified EV, a model of the identified EV, a build of the identified EV, a vehicle identification number (VIN) associated with the identified EV, historical vehicle operational or telematics data associated with the identified EV, or historical sensor data associated with the identified EV.

10. The computer-implemented method of claim 1, wherein determining the battery status indication corresponding to the identified EV includes:
    applying, by the one or more processors of the mobile computing device, a machine learning model, trained using training data corresponding to historical vehicle battery data and historical battery status indications associated with historical EVs, to the vehicle battery data, wherein the machine learning model includes one or more of: a deep learning neural network, natural language processing, semantic analysis, automatic reasoning, regression analysis, support vector machine (SVM) analysis, decision tree analysis, random forest analysis, K-Nearest neighbor analysis, naïve Bayes analysis, clustering, or reinforcement learning; and
    predicting, by the one or more processors of the mobile computing device, the battery status indication corresponding to the identified EV based upon applying the machine learning model to the vehicle battery data.

11. The computer-implemented method of claim 1, wherein the EV is a previously-owned vehicle available for purchase.

12. The computer-implemented method of claim 1, further comprising:
    determining, by the one or more processors of the mobile computing device, a vehicle insurance quote corresponding to the identified EV; and
    providing, via the user interface associated with the mobile computing device, the vehicle insurance quote corresponding to the identified EV.

13. The computer-implemented method of claim 1, further comprising:
    determining, by the one or more processors of the mobile computing device, a vehicle loan quote corresponding to the identified EV; and providing, via the user interface associated with the mobile computing device, the vehicle loan quote corresponding to the identified EV.

14. A system for tracking health and usage of electric vehicle (EV) batteries using QR codes, comprising:
a battery health and usage application comprising computer-executable instructions configured to execute on one or more processors selected from a device processor of mobile computing device or a server processor, the mobile computing device comprising a camera, a user interface, a transceiver, and a memory;
wherein the computer-executable instructions, when executed by the one or more processors cause the one or more processors to:
cause the camera to capture an image of a tag attached to an EV, wherein the tag is permanently or removably attached to the EV via a sticker;
analyze the image of the tag attached to the EV;
identify the EV based upon analyzing the image of the tag attached to the EV;
determine vehicle battery data associated with a rechargeable battery that powers the identified EV;
determine, based upon the vehicle battery data associated with the rechargeable battery that powers the identified EV, a battery status indication corresponding to the identified EV; and
provide, via the user interface, the battery status indication corresponding to the identified EV.

15. The system of claim 14, wherein the vehicle battery data includes one or more of: a type of rechargeable battery, a manufacturer of the rechargeable battery, a date of manufacture of the rechargeable battery, historical distances traveled by the identified EV per charge of the rechargeable battery that powers the identified EV, a number of times the rechargeable battery that powers the identified EV has been charged, historical amounts of time required to charge the rechargeable battery that powers the identified EV, or historical amounts of time between charges for the rechargeable battery that powers the identified EV.

16. The system of claim 14, wherein providing the battery status indication corresponding to the identified EV is further based upon vehicle data associated with the identified EV, and wherein at least a portion of the vehicle data is captured by an onboard computing device associated with the identified EV.

17. The system of claim 14, wherein providing the battery status indication corresponding to the identified EV is further based upon vehicle data associated with the identified EV, and wherein the vehicle data includes one or more of: a make of the identified EV, a model of the identified EV, a build of the identified EV, a vehicle identification number (VIN) associated with the identified EV, historical vehicle operational or telematics data associated with the identified EV, or historical sensor data associated with the identified EV.

18. The system of claim 14, wherein the computer-executable instructions cause the one or more processors to determine the battery status indication corresponding to the identified EV by:
applying a machine learning model, trained using training data corresponding to historical vehicle battery data and historical battery status indications associated with historical EVs, to the vehicle battery data, wherein the machine learning model includes one or more of: a deep learning neural network, natural language processing, semantic analysis, automatic reasoning, regression analysis, support vector machine (SVM) analysis, decision tree analysis, random forest analysis, K-Nearest neighbor analysis, naïve Bayes analysis, clustering, or reinforcement learning; and
predicting the battery status indication corresponding to the identified EV based upon applying the machine learning model to the vehicle battery data.

19. The system of claim 14, wherein the battery status indication includes a battery health indication.

20. The system of claim 14, wherein, the computer-executable instructions, when executed by the one or more processors, further cause the one or more processors to:
determine vehicle insurance quote data corresponding to the identified EV; and
provide the vehicle insurance quote data corresponding to the identified EV.

21. The system of claim 14, wherein, the computer-executable instructions, when executed by the one or more processors, further cause the one or more processors to:
determine vehicle loan quote data corresponding to the identified EV; and
provide the vehicle loan quote data corresponding to the identified EV.

22. A non-transitory computer-readable storage medium storing computer-readable instructions for tracking health and usage of electric vehicle (EV) batteries using QR codes, wherein the computer-readable instructions, when executed by one or more processors, cause the one or more processors to:
cause a camera to capture an image of a tag attached to an EV, wherein the tag is permanently or removably attached to the EV via a sticker;
analyze the image of the tag attached to the EV;
identify the EV based upon analyzing the image of the tag attached to the EV;
determine vehicle battery data associated with a rechargeable battery that powers the identified EV;
determine, based upon the vehicle battery data associated with the rechargeable battery that powers the identified EV, a battery status indication corresponding to the identified EV; and
provide, via a user interface, the battery status indication corresponding to the identified EV.

23. The computer-implemented method of claim 1, wherein the battery status indication includes a battery usage indication.

* * * * *